F. C. GENGE.
AUTOMOBILE CUSHIONS CONSTRUCTION.
APPLICATION FILED APR. 30, 1919.
1,370,886.
Patented Mar. 8, 1921.
3 SHEETS—SHEET 1.
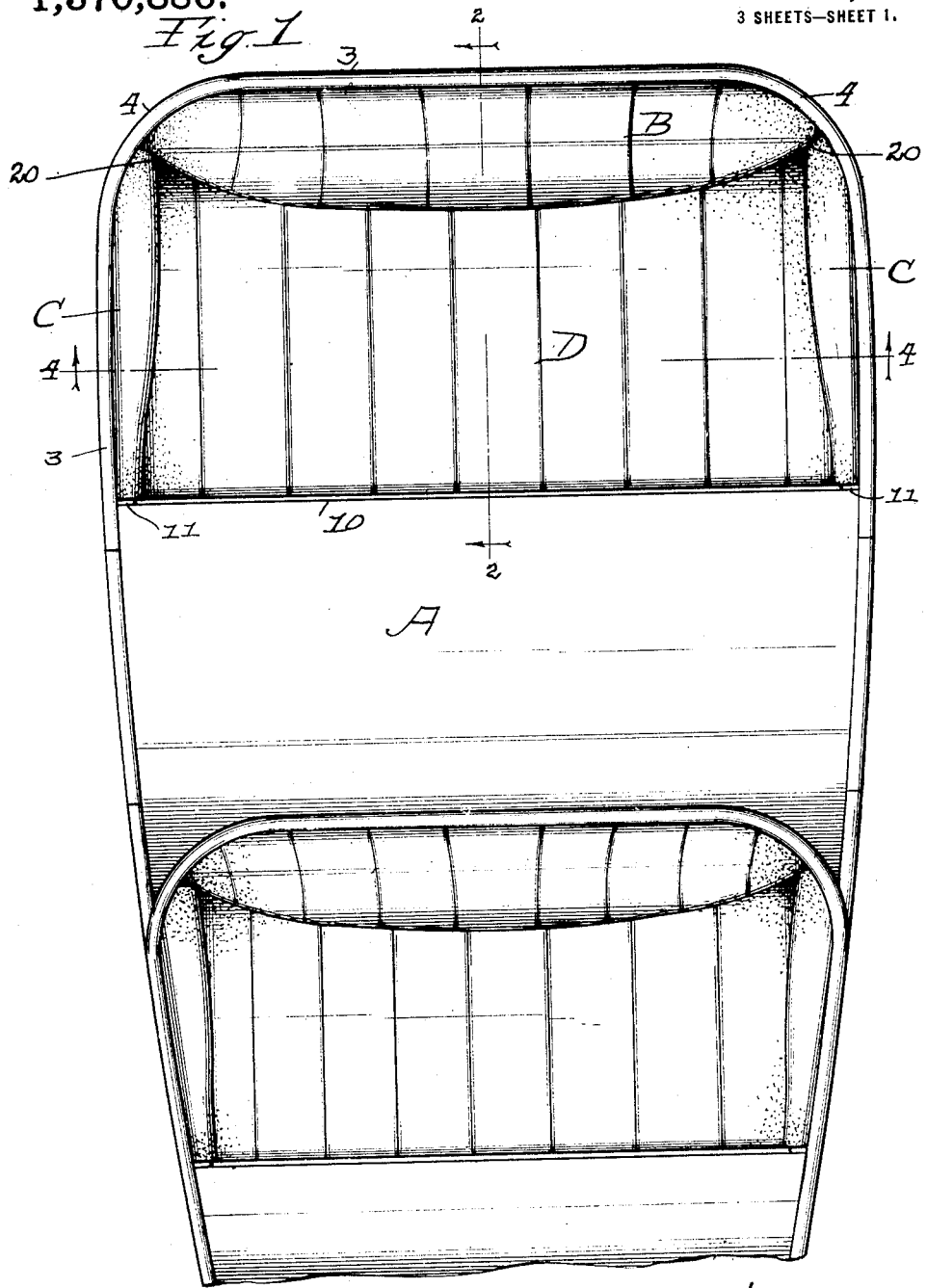
INVENTOR.
FREDRICK C. GENGE,
BY
his Atty

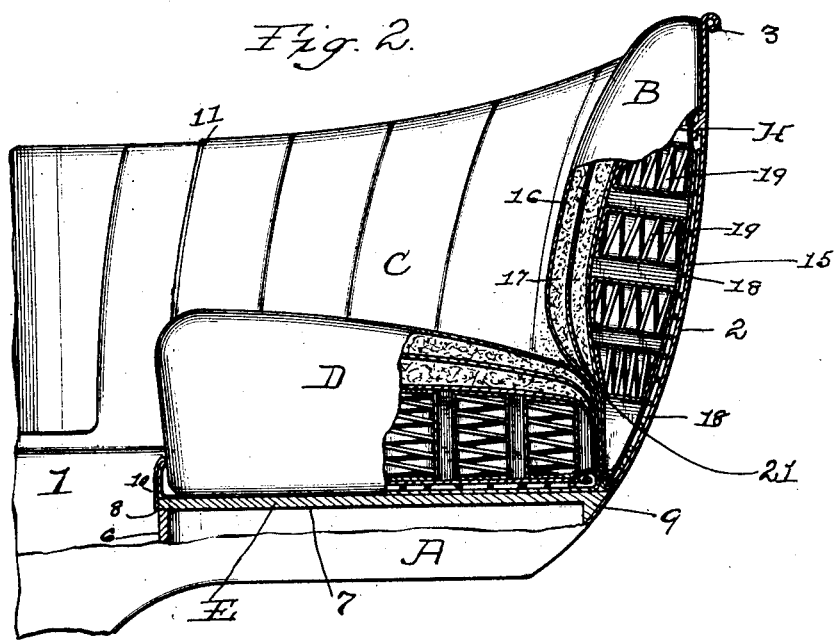
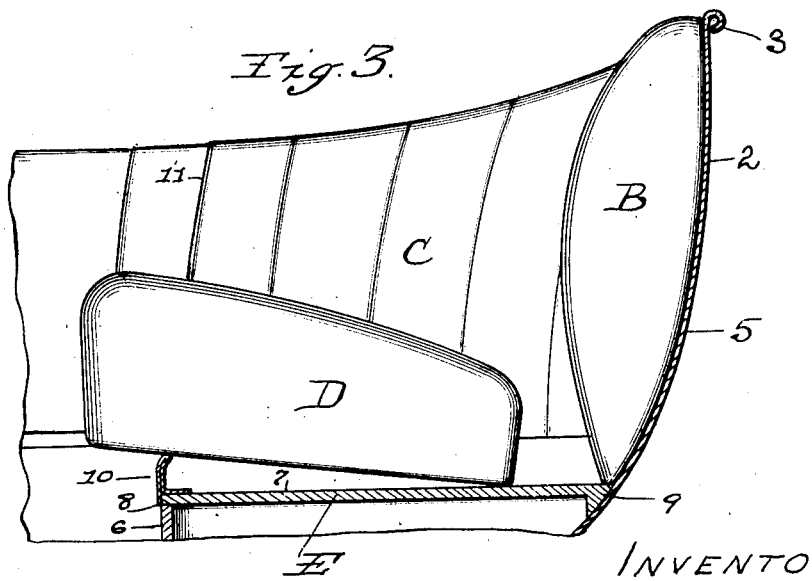

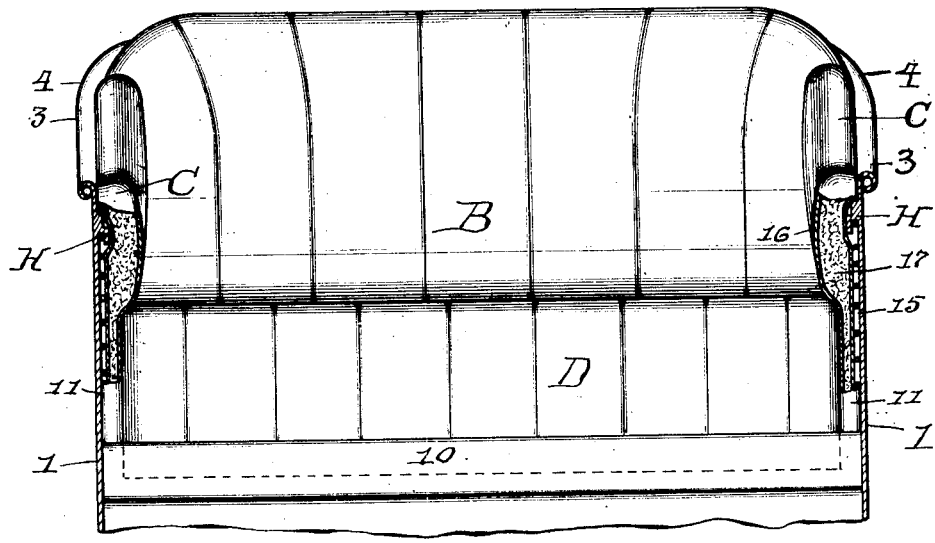

UNITED STATES PATENT OFFICE.

FREDRICK C. GENGE, OF CHICAGO, ILLINOIS, ASSIGNOR TO MARSHALL VENTILATED MATTRESS COMPANY, OF CHICAGO, ILLINOIS, A CORPORATION OF ILLINOIS.

AUTOMOBILE-CUSHIONS CONSTRUCTION.

1,370,886.     Specification of Letters Patent.     Patented Mar. 8, 1921.

Application filed April 30, 1919. Serial No. 293,771.

*To all whom it may concern:*

Be it known that I, FREDRICK C. GENGE, a citizen of the United States, and a resident of Chicago, in the county of Cook and State of Illinois, have invented certain new and useful Improvements in Automobile-Cushions Construction; and I do hereby declare that the following is a full, clear, and exact description thereof, reference being had to the accompanying drawings, and to the letters of reference marked thereon, which form a part of this specification.

This invention relates to a new and improved means for removably securing the cushions of an automobile, in place.

It has been customary heretofore to build within the metal body of an automobile, a seat supporting structure wholly or partially of wood, and then place the back cushion and the side or quarter cushions in position by securing them to the said frame. The top margins are given an upholstery finish by having the cushion or the top edge of the cushioning material fitted neatly over and secured to the top margin of the metal body by upholstery tacks.

When injury has been sustained to the car body, requiring overhauling or repainting, it has been necessary not merely to lift out the seat proper, but also to dismantle the car by removing the upholstery tacks and removing the means by which the rear cushion and the quarters or sides were secured to the frame work within the car body, and often to remove, also, the said frame work.

One of the objects of my invention is to provide a construction that will overcome the necessity of so much work being done to remove the cushions and seat before repair making begins and having to replace this work again when the repairs to the car body are completed.

Another object is to provide a construction doing away with interior frame work as a support for the cushions.

Another object is to provide a construction of side walls, cushions and seat so shaped and coördinated that while detachably secured to the car body, they will mutually hold each other against displacement while in position in the car body.

These and other features, objects and advantages of my invention will become more manifest as I proceed with my specification.

In the accompanying drawings:

Figure 1 represents, in a plan view, a typical automobile car body, equipped with cushions and seats, all arranged to embody my invention.

Fig. 2 is a vertical, longitudinal, sectional view of the car body, taken on the plane indicated by the dotted line 2—2 of Fig. 1, the end of the rear cushion and the seat being shown partially in full elevation and partially in section, the seat being in place.

Fig. 3 is a similar view to that of Fig. 2, showing the position of the seat just before being positioned in its place, and omitting the sectional parts of the seat and cushion shown in Fig. 2.

Fig. 4 is a vertical, transverse, sectional view of the car body, taken in the plane indicated by the dotted line 4—4 of Fig. 1, and looking at the rear cushion and the front ends of the rear seat and side cushions or quarters, in elevation, a portion of the side cushions or quarters being broken away.

Fig. 5 is a plan view of a portion of the flexible bottom or under part of the back cushion.

Fig. 6 is a detail view in section showing the intimate relation of the car body and the flexible cushion bottom and one means for interlocking them.

Referring now to that embodiment of my invention which I have thus chosen for illustration, A represents a metal car body as a whole, B the back cushion, C, C the side cushions or quarters, and D the seat.

The car body A comprises two side walls 1, 1, a rear wall 2, the latter terminating at its upper margin, with any desirable form or configuration of finish, such, for example, as the rolled over bead 3, which latter, as does the rear wall 2, bends forwardly at 4, 4, to be of uniform finish, since the back wall 2 is integral with the sides 1, 1. The rear wall 2 is bulged or curved outwardly from top to bottom as shown at 5, and may also be more or less variant from a straight line transversely or between the sides. The side walls 1, 1, may be similarly bulged or may be substantially straight, as shown, according to the special design of the builder of the car body.

Within the car body is a seat supporting frame, designated at E, as a whole, and made preferably of metal. The frame E, as shown, comprises a vertical front wall or member 6 and a horizontally disposed member 7, the latter suitably secured at 8 to the front member 6, and at 9 to the rear body wall 2. A raised up retaining flange member 10 is shown in the form of a double or folded strip of metal, suitably secured to the front margin of the member 7 and extending from side wall to side wall and, preferably, also extending at each side of the car, upwardly as at 11, to constitute a retaining flange for the side cushions or quarters C.

Upon the inner face of the wall 2 as well as of the side walls 1, 1, of the car body, and preferably somewhat near the upper or beaded margins 3 thereof, I place suitable angle irons or abutment hooks of any convenient form or design, such, for example, as the hooks H. These may be spot welded to the car body A. As shown, the hooks H comprise a base or attaching member 12 and an outwardly and downwardly projecting engaging finger 13, the abutment being, in this instance, indicated by the shoulder shown at 14.

The side cushions or quarters C, C, are made of a bottom member 15, an upholstery covering member 16 and intermediate filling or padding 17. The bottom member 15 is made of a screen or open mesh metal, preferably consisting of crossed wires 18, 18, as indicated in Fig. 5, the margins of the outer covering or upholstery member 16 being suitably secured to the bottom 15 in a manner to give a neat and finished appearance, especially at the upper edge, where it is in juxtaposition to the finished bead 3 or upper margin of the car body A.

In said cushion B, it is desirable to introduce filling material and also such resilient material as will make the rear cushion very much thicker than the sides or quarters C, C. To this end, it is my purpose to use a plurality of snubbed springs 19, 19, preferably of the form and arrangement shown in my pending application, Serial No. 198,386, filed October 25, 1917, although any suitable resilient spring unit may be used. The back cushion B, it will be understood is provided also with the metal bottom 15, and the outer upholstery material is brought down over the sides and secured to this bottom in any suitable or convenient manner to give the usual finished appearance to the cushion unit, especially where it is to be in juxtaposition to the bead 3.

It will be noted that the hooks H are positioned to the side walls 1 and to the back wall 2 in such manner that the fingers 13 point downwardly and are in position to be engaged by one of the horizontal wires 18 of the bottom 15 when the quarters C and the back B are in their proper positions. It will also be observed that the shoulders 14 of the hooks H thus act as abutments to prevent any movement upwardly of the quarters and of the back relative to the car body. It will also be understood that by using a bottom 15 of flexible but relatively stiff construction, such for example as the cross wires 18, 18, the quarters as well as the back cushions may be physically distorted, so to speak, by being pushed into position, so as to conform closely to any special curvature or configuration of the metal car body, and thus lie closely against the inside of the walls 1, 1, and 2, thereof.

In placing these cushions in the car, I first position the two side cushions or quarters against their respective side walls 1, 1. Care should be taken to engage one of the hooks H to the bottom of the quarter and to have the front margin thereof inside the flange member 11. Thus the flange 11 will keep the quarter from all tendency to move forwardly, while the hook H will hold it against any upward or vertical movement.

The rear cushion B is then positioned against the back wall 2, having its bottom 15 first bent in one or both directions to conform to the shape of the wall 2. The cushion B is also engaged by one or more hooks H to prevent all tendency to vertical or upward movement with respect to the rear wall. The seat D is then placed on the supporting frame E (Fig. 3) and pushed into final position, its front face being engaged by the flange 10, its rear edge cramping the lower part of the cushion B against the rear wall 2 as shown in Fig. 2, and its side edges pressing against the lower parts of the side cushions or quarters cramping them against the sides 1, 1, of the car body, as shown in Fig. 4.

The parts of the side cushions or quarters, and of the rear cushion, will be so constructed as to operate with the seat cushion in such manner as to coöperate in the way indicated and illustrated. That is to say, the seat D, when in position, will prevent the lower portions of the rear cushion B, and of the side quarters C, C, from moving inwardly. The side edges of the rear cushion B will also tend to hold the quarters in position against the car side walls 1, 1. The flanges 11, 11, will hold the quarters from forward movement, as the flange 10 will hold the seat D from forward movement. The hooks H will hold the rear cushion B and the quarters C, C, from upward movement. Thus each part supports and coöperates with the others to form the interior car finish and the parts in position, until it is desired to remove them to repair or work on the car body proper. There are no unsightly bolts or other fastening means, and these cushions, thus removably held in proper position.

When necessary to get at the interior of the car body, the forward end of the seat D is lifted clear of the flange 10, see Fig. 3, and then removed. The bottom edge of the rear seat B is then moved forwardly away from the wall 2, and then moved vertically until its bottom 15 is disengaged from the hooks H, when it may be removed. Similarly, the lower edges of the sides or quarters C. C, are first moved away from the side walls 1, and from the flange 11, and then moved to disengage them from the hooks H, and then removed.

The configuration and upholstery of the sides and back wall of course vary, according to the special design of the car body in which they are to be used, but they will always be such that their meeting edges indicated at 20, 20, may coöperate in a locking engagement for the purpose stated. Likewise, the lower portion of the back cushion B will be similarly finished to coöperate, as at 21, with the rear of the seat D. For example, the lowermost sets of springs 19, may be made shorter, or may be made so as to be compressed more, by the crowding action of the seat D, when in position. It will be understood, of course, that the pressure of the lower portion of the rear cushion B will tend to force the seat D outwardly and against the retaining flange 10.

The rear seat of an automobile, provided with my invention, would thus have four separate, removable units, comprising the seat proper, the rear cushion and the two side cushions firmly secured in place and accurately conforming to the contour of the car body, without the aid of screws or bolts, their meeting edges mutually supporting each other against displacement.

It will be understood, also, that with some designs of car body, it may be unnecessary to use the hooks H, or similar devices to engage the quarters and the back cushion bottoms, since the upper margins may be so finished as to engage with the top margins of the car body to prevent any vertical movement with respect to the car body.

For example, in some cars the beaded flange 3 may be rolled inwardly, instead of outwardly, as herein shown, and thus form a suitable abutment for the upper edges of the quarters and the back cushion.

I claim as my invention:

1. The combination with an automobile body, of removable cushions therefor and hooked members extending between the cushions and body, intermediate the top and bottom of said cushions and body, and adapted to maintain the fixed relation between the body and cushions when the latter are in position, substantially as described.

2. The combination with an automobile body, of removable cushions therefor, outwardly extending hook members mounted on the body, below the top thereof, and means carried by the cushions adapted to extend behind said members and thereby limit any shifting movement of the cushions from their normal position.

3. An automobile body, a removable wall cushion, a bottom member on said cushion consisting of crossed wires, a fixed locking hook adapted to engage one of said cross wires and hold the wall cushion against upward movement relative to the body, a removable seat cushion having one of its margins adapted to engage the bottom portion of the wall cushion to hold the same from displacement against the wall body, a transversely arranged upturned flange member on said body adapted to engage the front portion of the seat cushion to hold the latter in its normal position.

In testimony that I claim the foregoing as my invention I affix my signature in the presence of two witnesses this 28th day of April, A. D. 1919.

FREDRICK C. GENGE.

Witnesses:
 TAYLOR E. BROWN,
 B. L. MACGREGOR.